June 30, 1959   J. R. HOLLINS   2,892,996
TURN SIGNALLING SYSTEM
Filed April 10, 1958   2 Sheets-Sheet 1

INVENTOR.
Jesse R. Hollins
BY
ATTORNEY

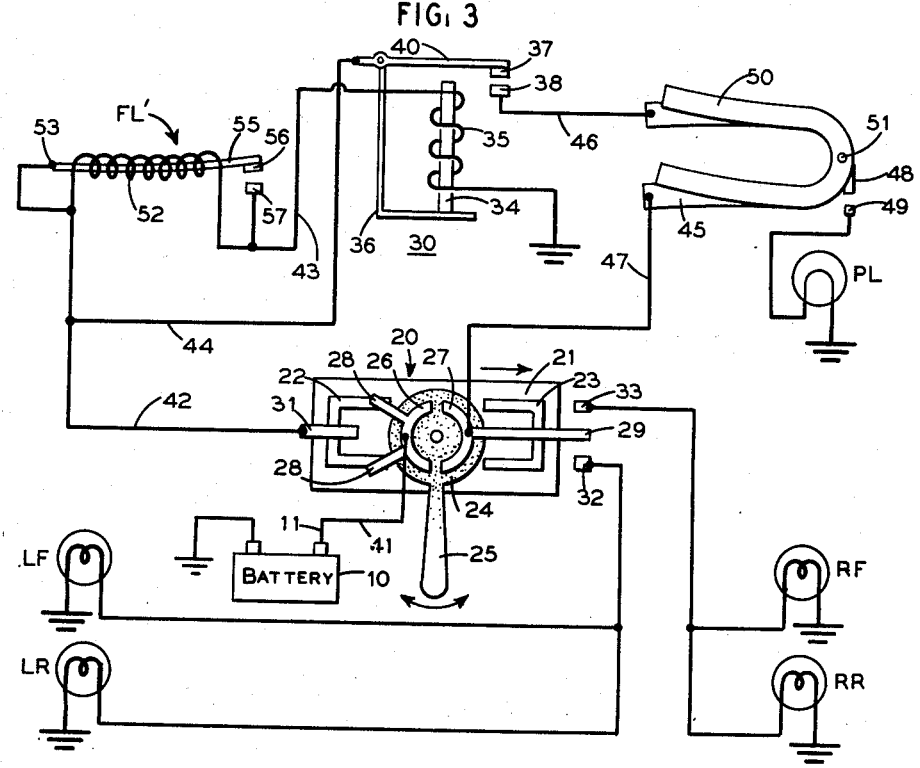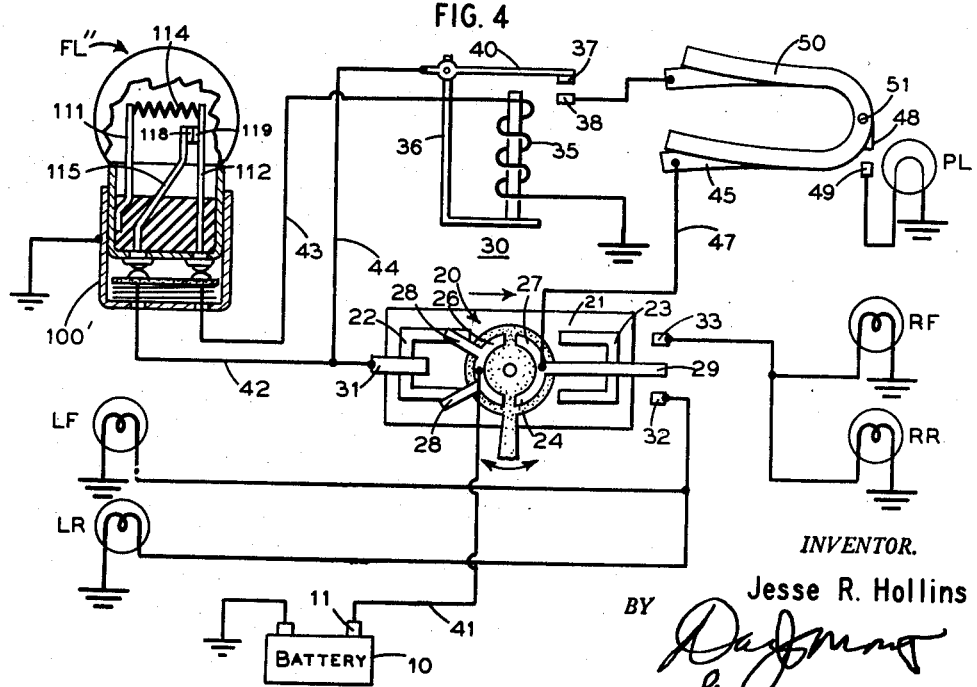

United States Patent Office 2,892,996
Patented June 30, 1959

2,892,996

TURN SIGNALLING SYSTEM

Jesse R. Hollins, Brooklyn, N.Y., assignor to Signal-Stat Corporation, Brooklyn, N.Y., a corporation of New York Application April 10, 1958, Serial No. 727,636

9 Claims. (Cl. 340—81)

This invention relates to turn signalling systems for automotive vehicles and, more particularly, to a novel system of this type in which the current flow through the flasher is independent of the signal lamp load.

In prior art automotive vehicle signalling systems, the flasher has had the full signal lamp current flow therethrough, and hence its operation has been dependent upon the current drawn by the signal lamps. The flasher contacts have had to carry the full signal lamp current, which is a fairly heavy load for these contacts. As a result, the flasher contacts have been subjected to fairly rapid deterioration due to excessive heating and breaking under heavy load. Also, the relay operating the pilot or indicator lamp has been in series with the signal lamps and thus subjected to overheating when the signal lamp load has been heavy or has been maintained for a long period of time.

In accordance with the present invention, deterioration of the flasher contacts is greatly reduced by making the flasher circuit independent of the signal lamp circuit by providing a novel selector switch having one set of contacts connecting the flasher to battery and another set of contacts connecting the signal lamps to battery through the contacts of a relay in series with the flasher. The selector switch is designed to energize selectively the signal lamps on either side of the vehicle or to energize simultaneously all the signal lamps to provide an emergency warning signal.

As a further feature of the invention, a novel thermostatic pilot lamp control element is provided in series with the signal lamps and incorporating automatically operable thermostatic means for reducing the resistance of the primary thermostatic element to about one-half its usual resistance when the signal lamp load is higher than usual. Such a condition occurs, for example, when the selector switch is in the "flare" position to energize all the signal lamps simultaneously.

For an understanding of the invention principles, reference is made to the following description of typical embodiments thereof as illustrated in the accompanying drawings. In the drawings:

Figs. 3 and 4 are schematic wiring diagrams of alternative embodiments of the invention.

Figure 1:
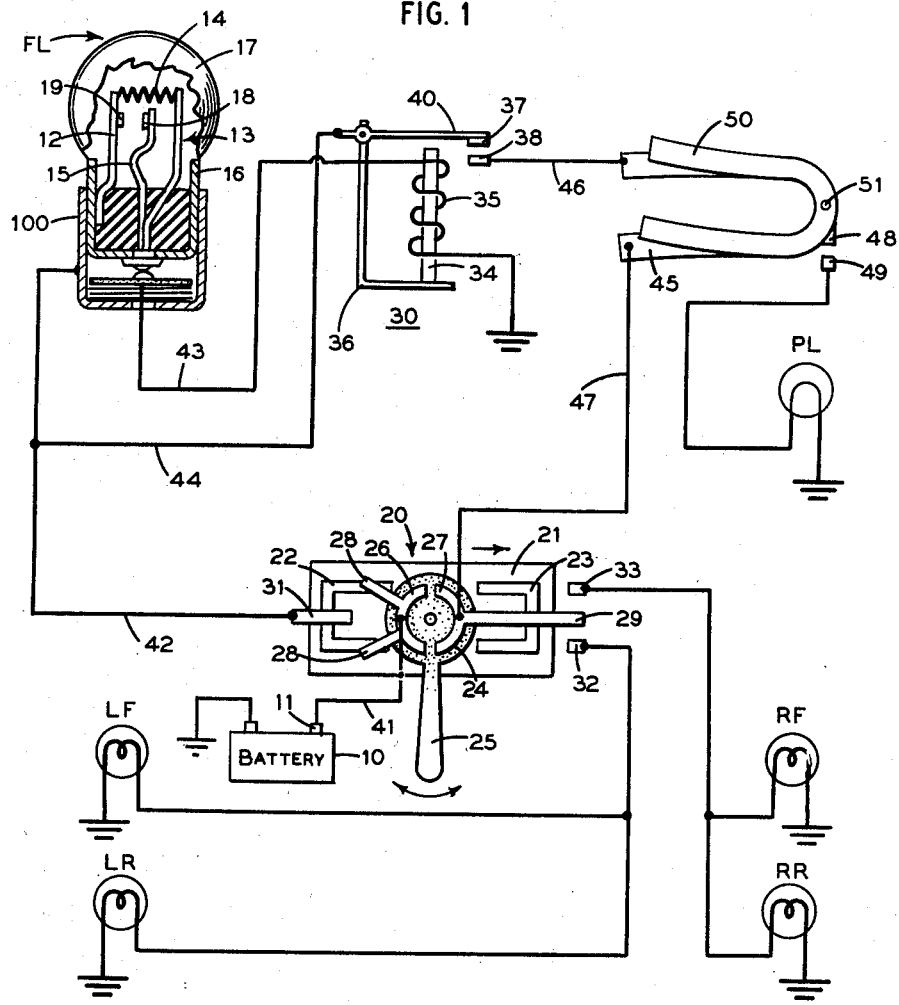
Fig. 1 is a schematic wiring diagram of an automotive turn signalling system embodying the invention and incorporating a sealed envelope type flasher.
Figure 2:
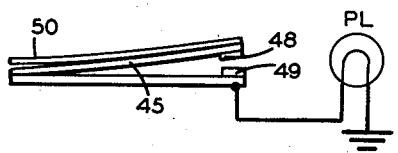
Fig. 2 is a side elevation view of the novel pilot lamp element.

Referring to Figs. 1 and 2, an automotive vehicle turn signalling system is illustrated as including the usual grounded turn signalling lamps LF, RF, LR, and RR mounted on opposite sides of the vehicle at the front and rear, and a pilot or indicator lamp PL usually mounted on the instrument panel or dash. The usual grounded source of electrical potential is illustrated schematically as a grounded battery 10 having a live or ungrounded terminal 11.

A sealed envelope type flasher FL is illustrated as comprising a base 16 engageable in a socket 100 and a sealed envelope 17 which may be transparent or translucent if desired. Flasher 15 has conductors 12, 13 between which is connected a high resistance filament 14. A thermomotive member 15, such as a bimetallic strip, has a fixed end connected to one conductor 13 and a free end carrying a contact 18 engageable with a contact 19 on the other conductor 12 when element 15 deflects due to heating by filament 14.

A novel selector switch 20 is provided comprising a dielectric base 21 on which are "square U-shape" conductive strips 22 and 23. A circular dielectric disk 24 is oscillatable on base 21 and has arcuate conductive strips 26, 27 thereon. Strip 26 has radial fingers 28, 28 normally engaged with strip 22 in the neutral or off position of the switch, and strip 27 has a radial finger 29 engaged with conductive strip 23. Disk 24 is oscillatable by a handle 25 to selectively signal a turn, and strip 21 is movable longitudinally to the right to provide flare signal operation.

A conductive strip 31 extends over strip 22 in spaced relation thereto, and has an end bent down between arms 28. Strip 31 is engageable with either arm 28 upon operation of handle 25, and its bent down end is engageable with strip 22 upon movement of base 21 to the right. Strip 29, upon operation of arm 25, is selectively engageable with either of a pair of contacts 32, 33 connected, respectively, to the left side signal lamps LF and LR and the right side signal lamps RF and RR. Upon movement of base 21 to the right, strip 23 engages both contacts 32 and 33 as well as contact strip 29.

A conductor 41 connects battery terminal 11 to strip 26, and a conductor 42 connects contact 31 to conductor 12 of flasher FL. Conductor 13 of the flasher is connected by a conductor 43 to one end of a coil 35 wound on the core 34 of a relay 30 having a frame 36 and a movable armature 40 carrying a contact 37 engageable with a contact 38 upon full energization of coil 35. The other end of coil 35 is grounded.

A conductor 44 connects conductor 42 to armature 40, and a conductor 46 connects contact 38 to one end of a U or V-shape thermostatic or bimetallic element 45. The other end of bimetallic element 45 is connected to switch conductor strip 27 by a conductor 47. The ends of strip 45 are fixed against movement, and the bight or apex of the strip carries a contact 48 normally disengaged from a contact 49 connected to grounded pilot lamps PL. When strip 45 is heated by maximum current flow therethrough, it deflects to engage contacts 48 and 49, thus causing the pilot lamp to light and flash in synchronization with the flashing of the signal lamps.

In accordance with the invention, a second U or V-shape thermostatic strip has its bight or apex connected to the bight or apex of strip 45, as at 51. As seen in Fig. 2, the ends of strip 50 overlie and are normally spaced from the ends of strip 45. However, upon excessive heating of strip 45, the heat conduction into strip 50 causes the latter to deflect and lie completely against strip 45. This reduces the resistance between the ends of strip 45 to about one-half its usual value, when strips 45 and 50 are substantially identical. Hence, with a doubled lamp load, as during flare operation, when both pair of signal circuits are closed by positioning contact plate 21, the effective resistance of the pilot lamp element is reduced by one-half so that the total IR drop therethrough remains at about its normal value with resultant normal operation of the pilot lamp relay. Without strip 50, strip 45, with a doubled lamp load, would not allow sufficient current to flow through it, and would by means of its resistance value reduce the illuminating value of the signal lamps.

The arrangement of Fig. 1 operates in the following manner. When lever 25 is moved to signal a turn one strip 28 is engaged with contact 31 and strip 29 is engaged with a contact 32 or 33. Flasher FL is energized over the following circuit: battery 10, terminal 11, conductor 41, strips 26 and 28, contact 31, conductor 42, flasher conductor 12, high resistance filament 14, flasher conductor 13, conductor 43, relay coil 35, and ground. The current through coil 35 is limited by filament 14 and is insufficient to operate armature 40.

Filament 14 heats the interior of envelope 17, and element 15 deflects to engage contacts 18, 19. This shunts filament 14 and the relay coil current is now sufficient to operate armature 40. The signal lamps are energized over the following circuit: conductors 42 and 44, armature 40, contacts 37, 38, conductor 46, strip 45, conductor 47, strips 27, 29, contact 32 or 33, the left or right signal lamps, and ground.

The current flow through strip 45 heats the latter to deflect and engage contacts 48 and 49, energizing pilot lamp PL. As shunted filament 14 cools, element 15 disengages contacts 18, 19, reducing the current flow to drop relay 30, thus reducing its magnetic force. This results in the release of armature 40, which springs away from its closed position opening contacts 37 and 38. This breaks the electric circuit from the battery, then armature 40, contacts 37 and 38, bimetal element 45, switch element 27, contact 29 in connection with either terminal 32 or 33 and signal lamps connected thereto.

When contact element 15 has broken circuit between contacts 18 and 19, the filament element becomes hot, which heats contact element 15 and causes it to flex and close contacts 18 and 19, thus repeating its cycle, which, in turn, repeats the entire electric circuit cycle.

For flare operation, base 21 is moved to the right to engage strip 22 with contact strip 31, and strip 23 with both contacts 32, 33. The operating cycle is as described, but the current flow through strip 45 is doubled so that this strip tends to remain deflected. The heat transfer to strip 50 causes this strip to deflect to engage strip 45 and the pilot lamp element then operates in the normal manner. In flare operation, all the signal lamps are flashed simultaneously.

In the embodiment of Fig. 3, a bimetallic strip type of fllasher FL' is substituted for flasher FL of Fig. 1. Conductor 42 is connected to one end of an insulated high resistance winding 52 wound on a conductive thermostatic strip 55 and having one end electrically connected to strip 55 at 53. The free end of strip 55 carries a contact 56 normally disegaged from a contact 57 connected to the other end of heater coil or winding 52 and to conductor 43 connected to relay coil 35. The other circuit connections are the same as in Fig. 1.

When switch 20 is closed, current flows through winding 52 but is insufficient to pick up relay 30 until strip 55 is heated sufficiently to deflect and engage contacts 56 and 57. This shunts winding 52 for full current flow through relay coil 35 to operate armature 40. As shunted winding 52 cools, strip 55 disengages contacts 56, 57 and the cycle repeats.

The arrangement of Fig. 4 incorporates a sealed envelope flasher FL" which provides for energization of the signal lamps immediately upon closure of switch 20. Flasher conductor 111 is grounded, and conductor 112 connected to coil 35 by conductor 43. Switch conductor 42 is connected to thermomotive element 115 which is arranged so that its contact 118 is normally engaged with contact 119 on conductor 112.

This arrangemnet operates in the following manner. When switch 20 is closed, full current immediately flows through conductor 42, element or operator 115, conductors 112 and 43, coil 35, and ground, and armature 40 is operated to close the signal lamp circuit. Current also flows through filament 114 and conductor 112 to ground. As filament 114 heats, element 115 deflects to break the battery connection to flasher FL", and relay 30 is dropped. As filament 114 cools, element 115 reengages contacts 118, 119 and the cycle repeats.

While specific embodiments of the invention have been shown and described in detail to illustrate the application of the invention principles, it will be understood that the invention may be embodied otherwise without departing from such principles.

What is claimed is:

1. An automotive vehicle turn signalling system comprising, in combination, a grounded source of electric potential; at least one grounded left turn signal lamp means; at least one grounded right turn signal lamp means; a thermostatically operable flasher including a high resistance, a thermomotive operator controlling current flow through said resistance, and operable, upon heating by said resistance, to interrupt effective current flow through said resistance, and flasher contacts cyclically opened and closed by said operator; a relay having a grounded coil, an armature operable by said coil when the latter is effectively energized, and armature contacts closed by operation of said armature; circuit means connecting said flasher contacts in energization controlling operative relation to said coil; a turn signal selector switch having a neutral position and a pair of operated positions and including first and second jointly operable switch means, said first switch means, in either operated position of said switch, connecting said coil and said high resistance to said battery, and said second switch means, in an operated position of said switch, connecting a selected left or right signal lamp means to said armature contacts; said flasher contacts cyclically varying the energization of said coil between effective and ineffective values to flash the connected signal lamp means.

2. An automotive vehicle turn signalling system as claimed in claim 1 including a grounded pilot lamp and a pilot lamp relay controlling energization of said pilot lamp and having an operating component connected in series between said second switch means and said armature contacts.

3. An automotive vehicle turn signalling system as claimed in claim 1 in which said switch has a further operated position in which said second switch means connects both signal lamp means to said armature contacts.

4. An automotive vehicle turn signalling system as claimed in claim 1 in which said high resistance is in series with said coil and said flasher contacts are normally open and shunt said resistance when closed.

5. An automotive vehicle turn signalling system as claimed in claim 1 in which said high resistance is in shunt with said coil and said flasher contacts are normally closed and disconnect the battery from said resistance and coil when opened.

6. An automotive vehicle turn signalling system as claimed in claim 2 in which said pilot lamp relay comprises a substantially flat forked thermostatic conductive metal strip connected in series between said second switch means and said armature contacts; a first contact at the junction of the legs of said strip; and a second contact connected to said pilot lamp and normally disengaged from said first contact; said strip, upon heating by signal lamp current flow therethrough, deflecting to engage said first and second contacts.

7. An automotive vehicle turn signalling system as claimed in claim 6 in which said switch has a further operated position in which said second switch means connects both signal lamp means to said armature contacts.

8. An automotive vehicle turn signalling system as claimed in claim 7 including a second thermostatic conductive metal strip in heat transfer relation to the first strip and effective, when said switch is in said further operated position resulting in increased current flow through the first strip, to shunt the first strip.

9. An automotive vehicle turn signalling system as claimed in claim 7 including a second thermostatic conductive metal strip substantially congruent with said first strip and connected to the latter at such junction, the legs of said second strip being normally spaced from those of the first strip; said second strip, upon increased heating of said first strip when said switch is in said further operated position, deflecting to lie against said first strip to reduce the effective resistance of the pilot lamp relay to substantially the normal value.

No references cited.